(12) United States Patent  
Therien

(10) Patent No.: US 7,089,459 B2  
(45) Date of Patent: Aug. 8, 2006

(54) LIMIT INTERFACE FOR PERFORMANCE MANAGEMENT

(75) Inventor: Guy M. Therien, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 557 days.

(21) Appl. No.: 10/261,310

(22) Filed: Sep. 30, 2002

(65) Prior Publication Data

US 2004/0064755 A1    Apr. 1, 2004

(51) Int. Cl.  
  *G06F 11/00*    (2006.01)
(52) U.S. Cl. ........................................... 714/47
(58) Field of Classification Search .................. 714/47  
See application file for complete search history.

(56) References Cited

U.S. PATENT DOCUMENTS

| | | | |
|---|---|---|---|
| 5,021,679 A | 6/1991 | Fairbanks et al. | |
| 5,153,535 A | 10/1992 | Fairbanks et al. | |
| 5,307,003 A | 4/1994 | Fairbanks et al. | |
| 5,396,059 A * | 3/1995 | Yeates | 250/214 C |
| 5,500,940 A * | 3/1996 | Skeie | 714/25 |
| 5,513,361 A * | 4/1996 | Young | 713/320 |
| 5,560,022 A | 9/1996 | Dunstan et al. | |
| 5,590,061 A * | 12/1996 | Hollowell et al. | 702/130 |
| 5,627,412 A | 5/1997 | Beard | |
| 5,664,201 A * | 9/1997 | Ikedea | 713/320 |
| 5,752,011 A | 5/1998 | Thomas et al. | |
| 5,752,050 A | 5/1998 | Hernandez et al. | |
| 5,764,506 A * | 6/1998 | Eynaud | 700/12 |
| 5,974,557 A | 10/1999 | Thomas et al. | |
| 5,997,167 A * | 12/1999 | Crater et al. | 700/79 |
| 6,112,164 A * | 8/2000 | Hobson | 702/132 |
| 6,148,418 A * | 11/2000 | Wang et al. | 714/25 |
| 6,216,235 B1 | 4/2001 | Thomas et al. | |
| 6,332,202 B1 * | 12/2001 | Sheikh et al. | 714/39 |
| 6,487,668 B1 | 11/2002 | Thomas et al. | |
| 6,574,740 B1 * | 6/2003 | Odaohhara et al. | 713/323 |
| 6,882,963 B1 * | 4/2005 | Slaight | 702/186 |
| 6,934,864 B1 * | 8/2005 | Chu et al. | 713/324 |
| 2002/0049920 A1 | 4/2002 | Staiger | |
| 2002/0104030 A1* | 8/2002 | Ahn | 713/310 |
| 2002/0138159 A1 | 9/2002 | Atkinson | |

FOREIGN PATENT DOCUMENTS

WO    WO 02/25414 A2    3/2002

OTHER PUBLICATIONS

INTEL, Device Driver Power and Performance Management, Aug. 2001, Intel.

* cited by examiner

*Primary Examiner*—Scott Baderman  
*Assistant Examiner*—Joshua Lohn  
(74) *Attorney, Agent, or Firm*—Blakely, Sokoloff, Taylor & Zafman LLP

(57) ABSTRACT

In one embodiment of the invention, an environmental condition relating to a first device is monitored. The first device operates in a first performance state. A limit command is generated based on the environmental condition requesting the first device to adjust the first performance state to a second performance state.

30 Claims, 4 Drawing Sheets

LIMIT INTERFACE FOR PERFORMANCE MANAGEMENT

BACKGROUND

1. Field of the Invention

Embodiments of the invention relate to the field of microprocessors, and more specifically, to processor performance states.

2. Description of Related Art

Advances in microprocessor technology have provided users with high level of performance flexibility. For example, emerging processors have multiple performance state efficiencies. Device performance states typically trade device performance for a reduction in one or more of the following device parameters: power consumption, thermal operation, and acoustical characteristics. Performance policy is usually driven by multiple factors such as device activity or demand, power source, user preferences (e.g., performance, power savings, and acoustics), and adverse conditions (e.g., thermal conditions, low battery power).

The Advanced Configuration and Power Interface (ACPI) specification introduced a new method for performing platform power management and enumeration. The architecture is table-based and has the capability to execute control methods written in ACPI Source Language (ASL) code. The ACPI provides a standard specification from which a global power management may be developed. This global approach, however, has a number of disadvantages. First, the model assumes that the OS knows the capabilities of and can control all the devices or processors in the platform. This is not necessarily true when newer devices are added to the platform. Second, the model cannot distinguish individual devices or processors in terms of power management. In practice, each device or processor may have different performance characteristics. Third, the model creates burden to provide various device drivers.

BRIEF DESCRIPTION OF THE DRAWINGS

The invention may best be understood by referring to the following description and accompanying drawings that are used to illustrate embodiments of the invention. In the drawings.

DESCRIPTION OF THE INVENTION

Figure 1:
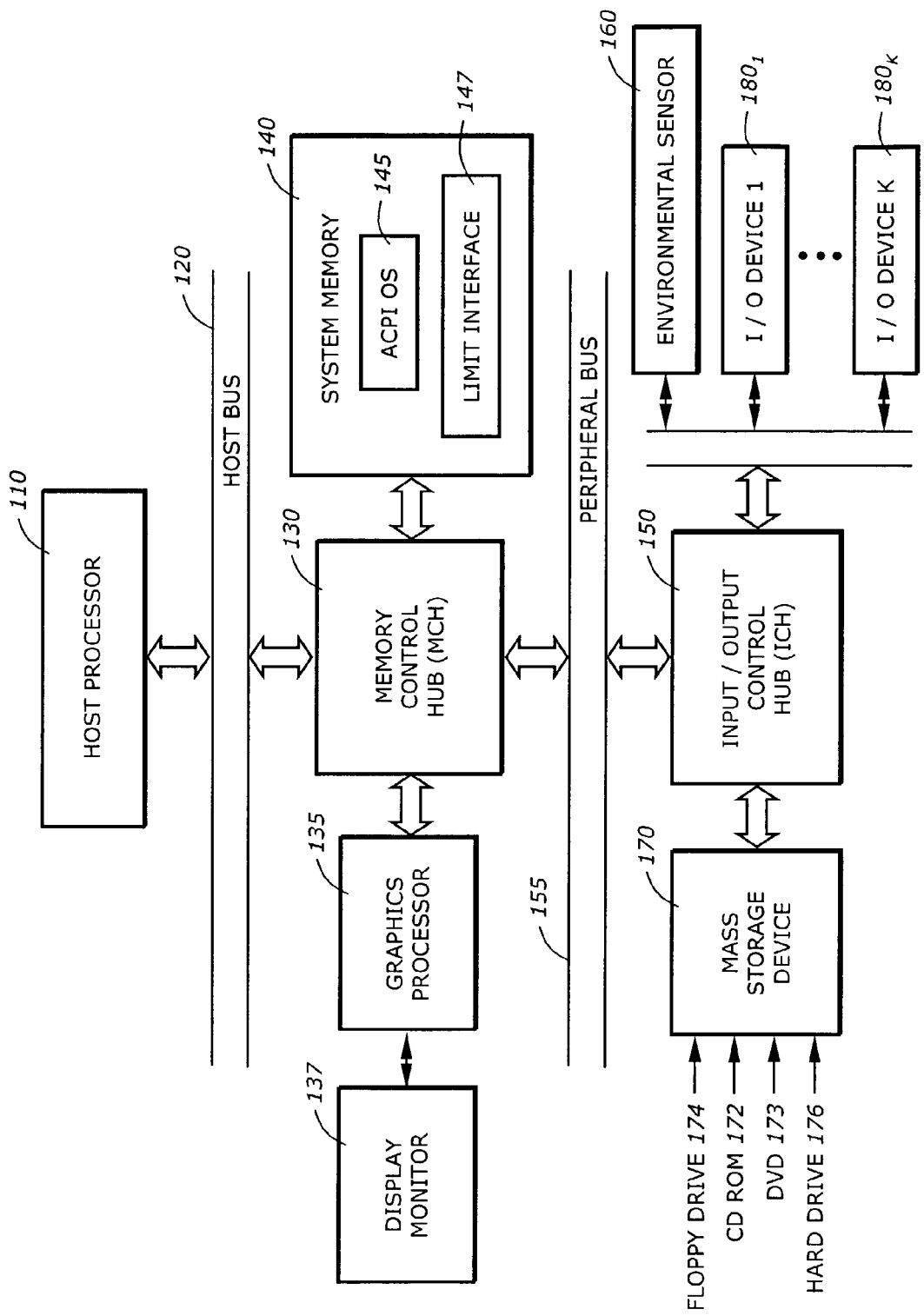
FIG. 1 is a diagram illustrating a system in which one embodiment of the invention can be practiced.

In one embodiment of the invention, an environmental condition relating to a first device is monitored. The first device operates in a first performance state. A limit command is generated based on the environmental condition requesting the first device to adjust the first performance state to a second performance state. In another embodiment of the invention, a limit command based on an environmental condition to a device is received. The device translates the limit command to a limit control to adjust the performance state. The device operates in a first performance state. The first performance state of the device is adjusted to a second performance state according to the limit command.

In the following description, numerous specific details are set forth. However, it is understood that embodiments of the invention may be practiced without these specific details. In other instances, well-known circuits, structures, and techniques have not been shown in order not to obscure the understanding of this description.

Elements of one embodiment of the invention may be implemented by hardware, software, firmware, microcode, or any combination thereof. When implemented in software, firmware, or microcode, the elements of the embodiment of the present invention are the program code or code segments to perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the machine accessible medium include an electronic circuit, a semiconductor memory device, a ROM, a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operation described in the following. The term "data" here refers to any type of information that is encoded for machine-readable purposes. Therefore, it may include program, code, data, file, etc.

All or part of an embodiment of the invention may be implemented by software. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

It is noted that an embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

FIG. 1 is a diagram illustrating a system 100 in which one embodiment of the invention can be practiced. The system 100 includes a host processor 110, a host bus 120, a memory control hub (MCH) 130, a graphics processor 135, a display monitor 137, a system memory 140, an input/output control hub (ICH) 150, a peripheral bus 155, a mass storage device 170, an environmental sensor 160, and input/output devices $180_1$ to $180_K$. Note that the system 100 may include more or less elements than these elements.

The host processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The host bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. The MCH 130 interfaces to the peripheral bus 155. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The graphics processor 135 is any processor that provides graphics functionalities. The graphics processor 135 may also be integrated into the MCH 130 to form a Graphics and Memory Controller Hub (GMCH). The graphics processor 135 may be a graphics card such as the Graphics Performance Accelerator (AGP) card, interfaced to the MCH 130 via a graphics port such as the Accelerated Graphics Port (AGP) controller. The graphics processor 135 provides interface to the display monitor 137 such as standard progressive scan monitor, television (TV)-out device, and Transition Minimized Differential Signaling (TMDS) controller. The display monitor 137 may be any display device such as Cathode Ray Tube (CRT) monitor, TV set, Liquid Crystal Display (LCD), Flat Panel, and Digital CRT.

The system memory 140 stores system code and data. The system memory 140 is typically implemented with dynamic random access memory (DRAM) or static random access memory (SRAM). The system memory may include program code or code segments implementing one embodiment of the invention. The system memory includes a power management operating system (OS) 145 which may include separate elements and a limit interface 147. Any one of the elements of the limit interface 147 may be implemented by hardware, software, firmware, microcode, or any combination thereof. The system memory 140 may also include other programs or data which are not shown, such as an operating system.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 155, processor interface, interrupt controller, direct memory access (DMA) controller, power management logic, timer, system management bus (SMBus), universal serial bus (USB) interface, mass storage interface, low pin count (LPC) interface, etc.

The environmental sensor 160 provides sensed information regarding the environment of the platform or a local subsystem. The environmental information may include temperature, thermal state, acoustic data, audio, light intensity, humidity, pressure, display condition (e.g.; brightness), power condition (e.g., battery, AC), and user condition (e.g., user preferences).

The mass storage device 170 stores archive information such as code, programs, files, data, applications, and operating systems. The mass storage device 170 may include compact disk (CD) ROM 172, a digital video/versatile disc (DVD) 173, floppy drive 174, and hard drive 176, and any other magnetic or optic storage devices. The mass storage device 170 provides a mechanism to read machine-readable media. The machine-readable media may contain computer readable program code to perform tasks as described in the following. These tasks may include receiving an environmental condition, generating a limit command, sensing the environmental condition, and adjusting the first performance state of a device.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card, and any other peripheral controllers.

The essence of one embodiment of the invention is a system level mechanism to control various independent device subsystems which implement a localized control polity for device performance states, especially when the local control policy is a demand-based control policy. A user influences the system power management through the input of preferences to the power, performance, and thermal policy software known as OS-directed power management (OSPM). These inputs include a preference towards performance or energy conservation and overriding environmental inputs including operational necessities required or warranted by environmental conditions such as amount of ambient light, desired acoustic level, and system's thermal control requirements. The user may specify preference for performance or energy conservation in a linear fashion between two extremes. The overriding inputs may specifically impact the control of independent subsystems or group of devices while leaving the overall system power management policy intact.

The user preference is controlled by a limit control which is implemented by the limit interface 147. As the limit is applied, the local policy is restricted to use a lower number or higher number of states and this either limits or expands the possible performance and power consumption of the device in the subsystem. By delegating the power and/or performance management tasks to the individual devices under a global requirement, high flexibility and efficiency may be achieved.

Figure 2:
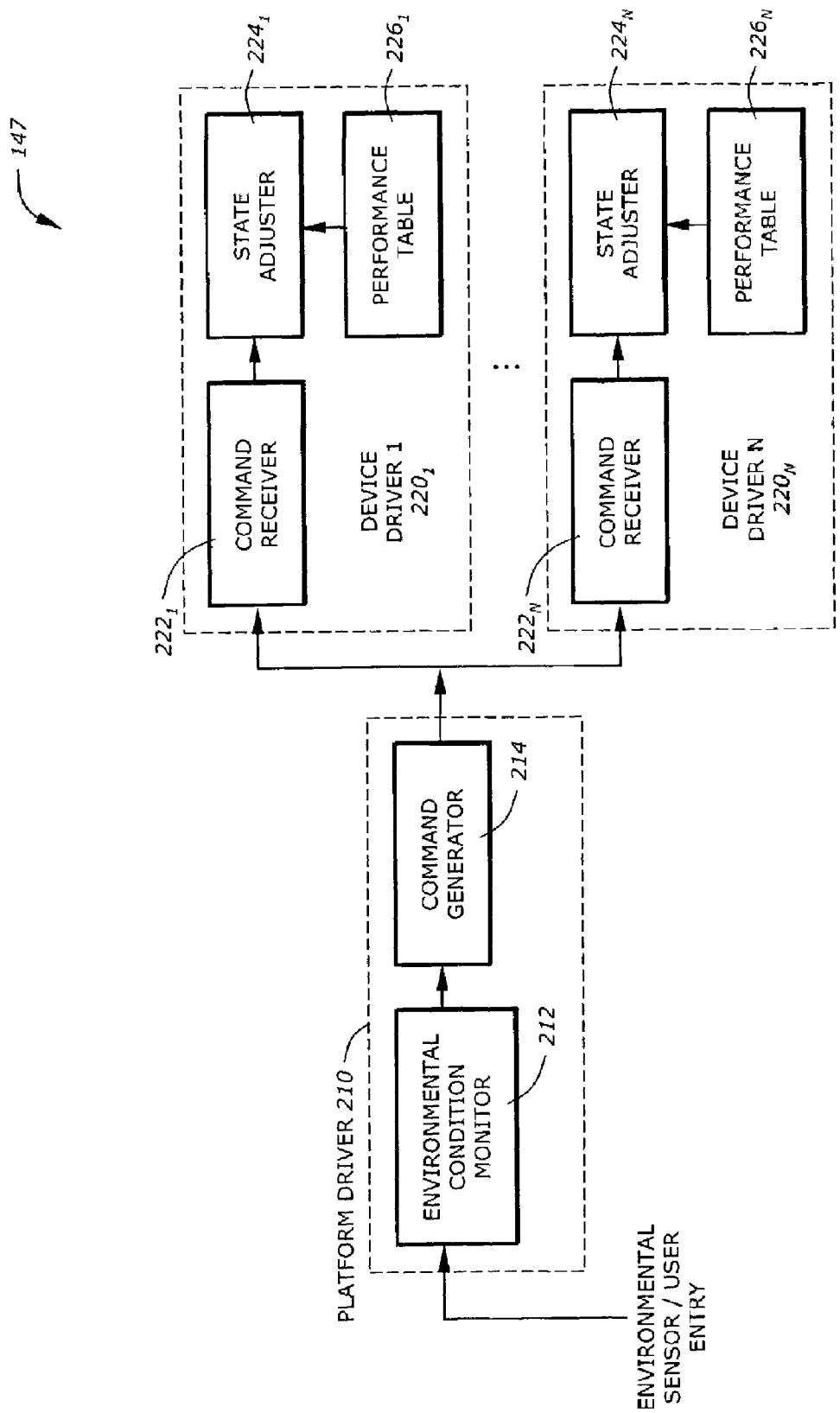
FIG. 2 is a diagram illustrating a limit interface according to one embodiment of the invention.

FIG. 2 is a diagram illustrating the limit interface 147 shown in FIG. 1 according to one embodiment of the invention. The limit interface 147 includes a platform driver 210 and N device drivers $220_1$ to $220_N$.

The platform driver 210 is a driver operated from the platform's point of view regarding the performance and/or power states of the devices or processors in the system. The devices may have a number of performance states, including a highest level, a lowest level, and an automatic, or demand-based level. In general, a high performance state corresponds to a low power state. The platform driver 210 may be part of the ACPI OS or the OSPM module. The platform driver 210 includes an environmental condition monitor 212 and a command generator 214.

The environmental condition monitor 212 monitors an environmental condition relating to a device or a processor. The device may be a media device (e.g., audio, imaging), a graphics processor, or a subsystem (e.g., an add-on computational card, a video editing unit). The environmental condition may relate to a single device, a subsytem or a group of devices. Each device operates in a current performance state. The environmental condition monitor 212 senses the environmental condition using a sensor (e.g., the environmental sensor 160 in FIG. 1) or an entry from the user. The environmental condition may include a thermal condition, a performance condition (e.g., operating frequency), an audio condition (e.g., an acoustic level), a display condition (e.g., a brightness level), an ambient light condition, a power condition (e.g., battery). The user entry may include a user preference as entered via the OSPM or any other user interface.

The command generator 214 generates a limit command based on the environmental condition to request the device or devices in the subsystem being monitored to change or adjust the current performance state to a next performance state. The environmental condition may be compared to a threshold or a band of threshold. The threshold or a band of threshold may be determined by the user or by some default values according to a power management policy. If the environmental condition exceeds an upper limit, then the command generator 214 issues a limit command to request the device to adjust its performance state to a lower state. For example, if the thermal condition of the local subsystem exceeds a high threshold, indicating a high temperature is being reached, the limit command requests the device or devices in the subsystem to limit their performance state or adjust the current performance state to a lower performance state which corresponds to a lower power state. Similarly, if the environmental condition exceeds a lower limit, then the command generator 214 issues a limit command to request the device or devices to adjust its performance state to a higher state. The environmental condition may include an ambient condition (e.g., thermal, acoustical), a performance condition (e.g., operating frequency, power consumption), or a user entry.

The command generator 214 broadcasts the limit command to all the devices in the subsystem being monitored. The individual devices then adjust their performance states according to their individual state characteristics.

The control of each device is performed by the corresponding device driver $220_k$. For clarity, the subscripts are dropped in the following description. The device driver 220 is a driver specific to the device being monitored. The device driver 220 may be part of the limit interface 147 (FIG. 1) or located locally within the device. The device driver 220 is typically installed in the system when the device is detected to be present in the system. The device driver 220 includes a command receiver 222, a state adjuster 224, and a performance table 226.

The command receiver 222 is an interface to receive the limit command issued or generated by the platform driver 210. The command receiver 222 may be implemented as a register, a control bit, or a control input. The receipt of the limit command may be implemented as a hardware interrupt, a trap, an exception, or a status polling.

The state adjuster 224 translates the limit command into a limit control action to change or adjust the current performance state to a next performance state according to the limit command. For example, if the limit command is to increase the limit or performance, the state adjuster 224 adjusts the current performance state to a higher performance state. The performance table 226 includes entries or control parameters to be loaded to the device by the state adjuster 224 which directs the device to adjust its performance/power state accordingly. The performance table 226 may correspond to a procedure or an algorithm that implements the power management. When the device is at the lowest performance state and the limit command requests to adjust the current performance state to a lower state, the device may stay the same: Similarly, when the device is at the highest performance state and the limit command requests to adjust the current performance state to a higher state, the device may stay the same.

Figure 3:
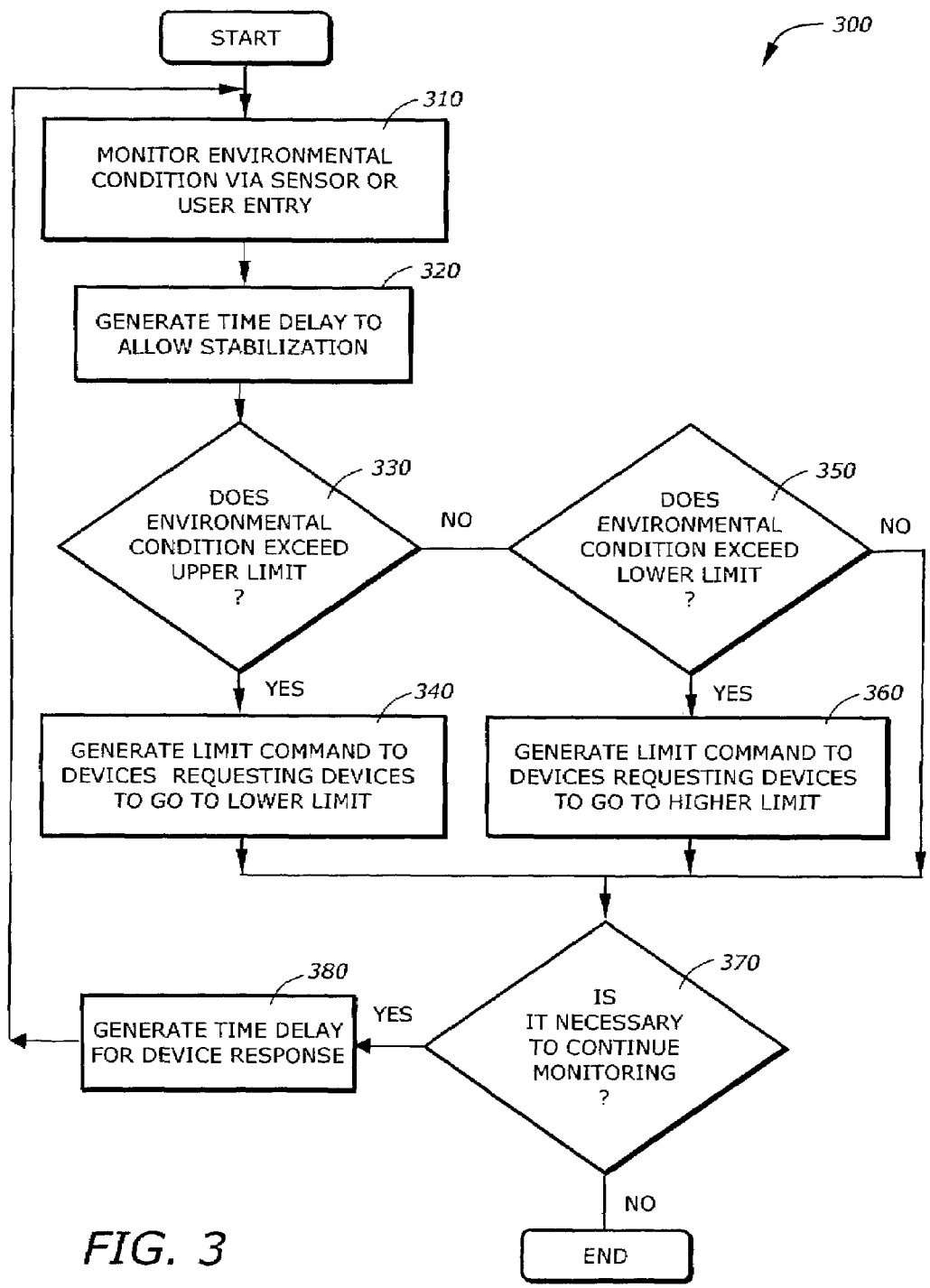
FIG. 3 is a flowchart illustrating a process to limit performance by the platform driver according to one embodiment of the invention.

FIG. 3 is a flowchart illustrating a process 300 to limit performance by the platform driver according to one embodiment of the invention.

Upon START, the process 300 monitors the environmental condition via sensor or user entry (Block 310). This may include receive information regarding a thermal condition, a performance condition, an audio condition, a display condition, a power condition, a user preference or entry, or any combination thereof. Next, the process 300 introduces an appropriate time delay to allow the monitoring area to stabilize (Block 320). Then the process 300 determines if the environmental condition exceeds an upper limit (Block 330). The upper limit may be set by user preference or by default value. If so, the process 300 generates a limit command to the devices to request the devices to go to a lower limit (Block 340). Typically, this may require the devices to change or adjust their current performance state to a lower performance state or to stay the same if their lowest limit has been reached. Then, the process 300 goes to Block 370. If the environmental condition does not exceed the upper limit, the process 300 determines if the environmental condition exceeds a lower limit (Block 350). The lower limit may be set by user preference or by default value. If so, the process 300 generates a limit command to the devices to request the devices to go to a higher limit (Block 360). Typically, this may require the devices to change or adjust their current performance state to a higher performance state or to stay the same if their highest limit has been reached. Then, the process 300 goes to Block 370. If the environmental condition neither exceeds the upper limit nor the lower limit, the process 300 proceeds to Block 370.

In block 370, the process 300 determines if it is necessary to continue monitoring. If so, the process 300 generates a delay to allow for the device response to take effect (Block 380). This delay may be determined according to the nature of the environmental condition. For example, a thermal condition may take longer than a user preference. Then, the process 300 returns to Block 310. Otherwise, the process 300 is terminated.

Figure 4:
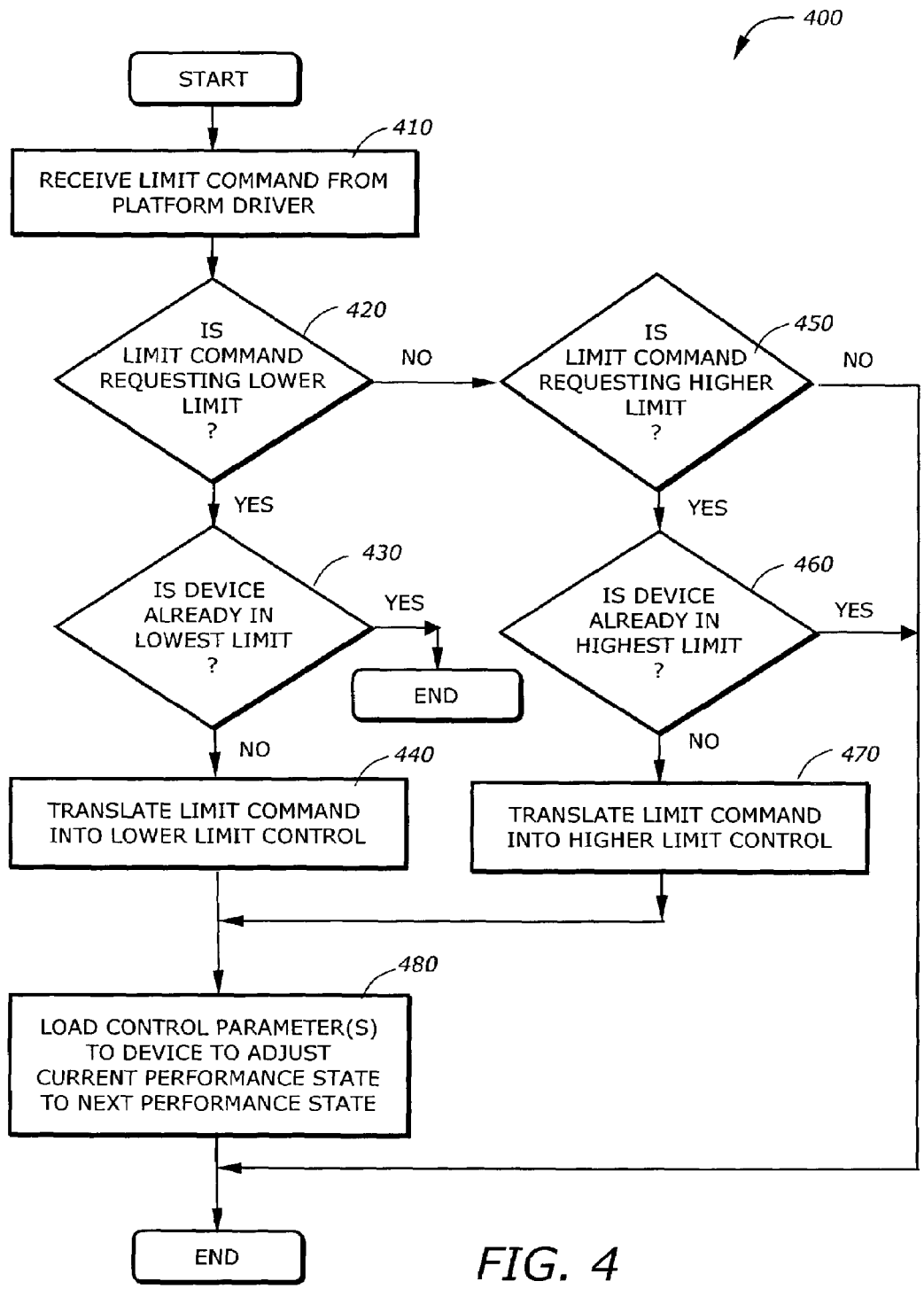
FIG. 4 is a flowchart illustrating a process to limit performance by a device driver according to another embodiment of the invention.

FIG. 4 is a flowchart illustrating a process 400 to limit performance by a device driver according to another embodiment of the invention.

Upon START, the process 400 receives a limit command from the platform driver (Block 410). This may be accomplished by storing the limit command in a register or responding to an interrupt or a trap. Then, the process 400 determines if the limit command is requesting a lower limit or a lower performance state (Block 420). If so, the process 400 determines if the device is already in the lowest limit (Block 430). If so, the process 400 is terminated. Otherwise, the process 400 translates the limit command into a limit control action to lower the device limit according to its specific management policy (Block 440). The control action may include the specific operations of the device to lower the device performance state according to the lower limit. For example, the control operations may set a pointer to a parameter table that contain the control parameters corresponding to a lower performance state. Then, the process 400 goes to Block 480. If the limit command is not requesting a lower limit, the process 400 determines if it is requesting a higher limit (Block 450). If not, the process 400 is terminated. Otherwise, the process 400 determines if the device is already in the highest limit (Block 460). If so, the process 400 is terminated. Otherwise, the process 400 translates the limit command into a limit control action to go to a higher limit (Block 470). The higher limit control action may include specific operations of the device to increase the device performance state according to the higher limit, such as setting a pointer to control parameters corresponding to higher performance state. Then, the process 400 goes to Block 480.

In block 480, the process 400 loads the control parameters to the device to activate the control function to decrease or increase the performance state accordingly (Block 480). The control parameters may be retrieved from a performance table or derived from a procedure. The control parameters may be loaded to a register inside the device directly, or to a power management interface data structure. By doing so, the process 400 changes or adjusts the current performance state to a next performance state. The process 400 is then terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An interface comprising:
   a platform driver comprising an environmental condition monitor to monitor an environmental condition relating to a device in a plurality of devices, each operating at a current performance state, and a command generator to generate a limit command based on the environmental condition to the devices; and
   a plurality of device drivers to control the plurality of devices, each of the device drivers comprising a state adjuster to translate the limit command into a limit control action to adjust the current performance state to a next performance state according to a device state characteristic;
   wherein each of the device drivers further comprises a performance table to contain control parameters to be loaded to a corresponding device to allow the state adjuster to direct the corresponding device to adjust the current performance state.

2. The interface of claim 1 wherein the environmental condition monitor senses the environmental condition using one of a sensor and an entry device.

3. The interface of claim 1 wherein the environmental condition is one of a thermal condition, a performance condition, an audio condition, a display condition, a power condition, and a user preference.

4. The interface of claim 1 wherein the device state characteristic is one of a performance state and a power state.

5. The interface of claim 1 wherein the performance table corresponds to a procedure that implements power management.

6. A method comprising:
   monitoring an environmental condition relating to a device in a plurality of devices, each operating at a current performance state,
   generating a limit command based on the environmental condition to the devices; and
   controlling the plurality of devices, comprising:
      translating the limit command into a limit control action to adjust the current performance state to a next performance state according to a device state characteristic, and
      loading a performance table containing control parameters to a corresponding device to allow directing the corresponding device to adjust the current performance state.

7. The method of claim 6 wherein monitoring the environmental condition comprises:
   sensing the environmental condition using one of a sensor and an entry device.

8. The method of claim 7 wherein sensing the environmental condition comprises:
   receiving information regarding at least one of a thermal condition, a performance condition, an audio condition, a display condition, a power condition, and a user preference.

9. The method of claim 6 wherein the device state characteristic is one of a performance state and a power state.

10. The method of claim 6 wherein the performance table corresponds to a procedure that implements power management.

11. An article of manufacture comprising:
   a machine-accessible medium including data that, when accessed by a machine, causes the machine to perform operations comprising:
   monitoring an environmental condition relating to a device in a plurality of devices, each operating at a current performance state,
   generating a limit command based on the environmental condition to the devices; and
   controlling the plurality of devices;
   wherein the data causing the machine to perform controlling the plurality of devices includes data that, when accessed by the machine, causes the machine to perform operations comprising:
      translating the limit command into a limit control action to adjust the current performance state to a next performance state according to a device state characteristic, and
      loading a performance table containing control parameters to a corresponding device to allow directing the corresponding device to adjust the current performance state.

12. The article of manufacture of claim 11 wherein the data causing the machine to perform monitoring includes data that, when accessed by the machine, causes the machine to perform operations comprising:
   sensing the environmental condition using one of a sensor and an entry device.

13. The article of manufacture of claim 12 wherein the data causing the machine to perform sensing the environmental condition includes data that, when accessed by the machine, causes the machine to perform operations comprising:

receiving information regarding at least one of a thermal condition, a performance condition, an audio condition, a display condition, a power condition, and a user preference.

14. The article of manufacture of claim 11 wherein the device state characteristic is one of a performance state and a power state.

15. The article of manufacture of claim 11 wherein the performance table corresponds to a procedure that implements power management.

16. A device driver comprising:
a command receiver to receive a limit command from a platform driver to a device operating at a current performance state, the limit command being based on an environmental condition;
a state adjuster coupled to the command receiver to translate the limit command into a limit control action to adjust the current performance state to a next performance state according to a device state characteristic; and
a performance table coupled to the state adjuster to contain control parameters to allow the state adjuster to direct the device to adjust the current performance state.

17. The device driver of claim 16 wherein the command receiver is one of a register, a control bit, a control input, a hardware interrupt, a trap, an exception, and a status polling.

18. The device driver of claim 16 wherein the environmental condition is one of a thermal condition, a performance condition, an audio condition, a display condition, a power condition, and a user preference.

19. The device driver of claim 16 wherein the device state characteristic is one of a performance state and a power state.

20. The device driver of claim 16 wherein the performance table corresponds to a procedure that implements power management.

21. A method comprising:
receiving a limit command from a platform driver to a device operating at a current performance state, the limit command being based on an environmental condition;
translating the limit command into a limit control action to adjust the current performance state to a next performance state according to a device state characteristic; and
loading a performance table containing control parameters to allow directing the device to adjust the current performance state.

22. The method of claim 21 wherein receiving the limit command comprises:
receiving the limit command via one of a register, a control bit, a control input, a hardware interrupt, a trap, an exception, and a status polling.

23. The method of claim 21 wherein the environmental condition is one of a thermal condition, a performance condition, an audio condition, a display condition, a power condition, and a user preference.

24. The method of claim 21 wherein the device state characteristic is one of a performance state and a power state.

25. The method of claim 21 wherein loading the performance table comprises:
loading a procedure that implements power management.

26. An article or manufacture comprising:
a machine-accessible medium including data that, when accessed by a machine, causes the machine to perform operations comprising:
receiving a limit command from a platform driver to a device operating at a current performance state, the limit command being based on an environmental condition;
translating the limit command into a limit control action to adjust the current performance state to a next performance state according to a device state characteristic; and
loading a performance table containing control parameters to allow directing the device to adjust the current performance state.

27. The article of manufacture of claim 26 wherein the data causing the machine to perform receiving the limit command includes data that, when accessed by the machine, causes the machine to perform operations comprising:
receiving the limit command via one of a register, a control bit, a control input, a hardware interrupt, a trap, an exception, and a status polling.

28. The article of manufacture of claim 26 wherein the environmental condition is one of a thermal condition, a performance condition, an audio condition, a display condition, a power condition, and a user preference.

29. The article of manufacture of claim 26 wherein the device state characteristic is one of a performance state and a power state.

30. The article of manufacture of claim 26 wherein the data causing the machine to perform loading the performance table includes data that, when accessed by the machine, causes the machine to perform operations comprising:
loading a procedure that implements power management.

* * * * *